United States Patent
Shin et al.

(10) Patent No.: US 11,976,448 B2
(45) Date of Patent: May 7, 2024

(54) FILTER WATER SPOUT ATTACHED TO BASIN FAUCET

(71) Applicant: ISOOIN CO., LTD., Bucheon-si (KR)

(72) Inventors: Woo-Seung Shin, Seoul (KR); Hong-Suk Lee, Siheung-si (KR); Min-Seop Oh, Incheon (KR); Se-Gwang Oh, Suwon-si (KR)

(73) Assignee: ISOOIN CO., LTD., Bucheon-si (KR)

( * ) Notice: Subject to any disclaimer, the term of this patent is extended or adjusted under 35 U.S.C. 154(b) by 106 days.

(21) Appl. No.: 17/996,337

(22) PCT Filed: Dec. 17, 2020

(86) PCT No.: PCT/KR2020/018550
§ 371 (c)(1),
(2) Date: Oct. 14, 2022

(87) PCT Pub. No.: WO2021/230454
PCT Pub. Date: Nov. 18, 2021

(65) Prior Publication Data
US 2023/0193605 A1   Jun. 22, 2023

(30) Foreign Application Priority Data
May 14, 2020   (KR) .................. 10-2020-0057834

(51) Int. Cl.
*E03C 1/04*   (2006.01)
*B01D 35/04*   (2006.01)

(52) U.S. Cl.
CPC ........... *E03C 1/0404* (2013.01); *B01D 35/04* (2013.01); *E03C 2201/40* (2013.01)

(58) Field of Classification Search
CPC ...... E03C 1/0404; E03C 2201/40; E03C 1/04; E03C 1/086; B01D 35/04; B01D 2201/4084; B01D 2201/4092; B01D 29/03
See application file for complete search history.

(56) References Cited

U.S. PATENT DOCUMENTS

| | | | |
|---|---|---|---|
| 11,440,813 B2 * | 9/2022 | Tanner | B01D 35/30 |
| 2003/0034285 A1 * | 2/2003 | Hembree | B01D 35/043 |
| | | | 210/473 |

(Continued)

FOREIGN PATENT DOCUMENTS

| | | | |
|---|---|---|---|
| CN | 213132234 U | * | 5/2021 |
| JP | 2005-163402 A | | 6/2005 |

(Continued)

OTHER PUBLICATIONS

International Search Report for PCT/KR2020/018550 by Korean Intellectual Property Office dated Mar. 15, 2021.

*Primary Examiner* — Christine J Skubinna
(74) *Attorney, Agent, or Firm* — BROADVIEW IP LAW, PC

(57) ABSTRACT

Disclosed is a filter water spout attached to a basin faucet that comprises: a connection nozzle screwed to a washbasin faucet outlet and extending a vertical connection tube downward; an elbow pipe in which a vertical receiving pipe is formed in a vertical direction and a horizontal receiving pipe is formed in a horizontal direction; a nozzle body having a horizontal connection tube formed on the side and having an open top; a nozzle cap coupled to an upper portion of the nozzle body; a horizontal rotation member for allowing the vertical connection tube of the connection nozzle to be rotatably coupled to the vertical receiving pipe of the elbow pipe; and a vertical rotation member for allowing the hori- (Continued)

zontal connection tube of the nozzle body to be rotatably coupled to the horizontal receiving pipe of the elbow pipe.

7 Claims, 14 Drawing Sheets

(56) References Cited

U.S. PATENT DOCUMENTS

| | | | |
|---|---|---|---|
| 2005/0098485 A1* | 5/2005 | Boyd | ........................ E03C 1/08 |
| | | | 210/100 |
| 2023/0193605 A1* | 6/2023 | Shin | ........................ B01D 35/04 |
| | | | 4/619 |

FOREIGN PATENT DOCUMENTS

| | | |
|---|---|---|
| JP | 2020-33839 A | 3/2020 |
| KR | 20-0460745 Y1 | 6/2012 |
| KR | 10-2012-0097714 A | 9/2012 |
| KR | 10-2013-0041624 A | 4/2013 |
| KR | 10-2019-0141104 A | 12/2019 |

* cited by examiner

FILTER WATER SPOUT ATTACHED TO BASIN FAUCET

CROSS-REFERENCE TO RELATED APPLICATIONS

This application is a National Phase Entry Application of PCT Application No. PCT/KR2020/018550 filed on Dec. 17, 2020, which claims priority to Korean Patent Application No. 10-2020-0057834 filed on May 14, 2020, in Korean Intellectual Property Office, the entire contents of which are hereby incorporated by reference in its entirety.

FIELD OF THE INVENTION

The present invention relates to a filter water spout attached to a basin faucet, and more particularly, to a filter water spout attached to the basin faucet that can be rotated in horizontal and vertical directions to selectively change the discharge direction of water and relates to a filter water spout attached to a basin faucet with a built-in filter that can purify water.

BACKGROUND TECHNOLOGY

In general, a faucet provided in a washbasin or a water fountain is provided with a valve for controlling the amount of water discharged through the outlet, and by operating the valve, the amount of water discharged through the outlet can be adjusted. Since the position of the outlet is fixed, water is discharged only in a fixed one direction.

When the outlet of the faucet is fixed and water is discharged only in one direction, the water is discharged only downward during washing in the sink. By repeatedly washing the face by receiving the water pouring downwards by hand, the water flow continues to be wasted while washing the face. In addition, when soap is applied to the face, the amount of water received by the hand leaks from the palm of the hand while moving it away from the faucet handle under the faucet, and the operation of rinsing the soap with insufficient water is repeated.

In addition, when brushing teeth, in order to receive water from the downward direction directly through the mouth, tilt the head and put the mouth to the outlet or use a separate cup/container with water.

Therefore, it is inconvenient to use by tilting the head. There is a problem in that water is wasted because more water flows down around the mouth and is wasted than water for rinsing the mouth. There is a hassle of washing after using a separate cup/container. When a cup is not provided as many as the number of users and a single cup is used by several people, there is a problem in that pathogens may be transmitted through the cup that is not washed cleanly.

In order to solve this problem, Korean Patent Publication No. 10-2012-0097714, " "A 2WAY DISCHARGE VALVE FOR FAUCET is disclosed. According to this invention, the water is discharged downward like a general washbasin spout, and water can be selectively discharged by branching water in an upward direction according to the pressurization and release of the valve. In order not to use the cup when brushing teeth, a small and adjustable water spout was installed upwards as an auxiliary and a switching valve was formed to switch the direction of water flow up and down.

However, in this invention, since the tube body extends downward when discharging downward, the space between the water outlet and the sink is narrow when washing hands, which is inconvenient.

On the other hand, a conventional water faucet for a washbasin is equipped with a water filter having a cylindrical filter built-in therein, so that harmful substances such as rust or foreign substances mixed in tap water can be cleaned. For example, as disclosed in Korean Patent Application Publication No. 10-2019-0141104, "CLEAN WATER FILTER FOR WASHBASIN," water comes down from the top of the faucet, passes through the sediment filter, and then flows down to the water sprinkling plate at the bottom.

FIG. 1 is a view showing a filter spout attached to a washbasin faucet equipped with a water filter according to the prior art.

Referring to FIG. 1, due to the filter spout 10, the height is lower than the water jetted from the general faucet, so when washing hands, user have to lower his back more, and the space between the spout and the washbasin is narrow, making it inconvenient to wash hands.

DETAILED DESCRIPTION OF THE INVENTION

Technical Purpose

The present invention has been devised in view of the above problems, and its purpose is to discharge water by being coupled to the faucet spout, and the spout connected to the faucet of the washbasin is configured to rotate 360 degrees horizontally and vertically, respectively. It is to provide a filter spout attached to the washbasin faucet that can be used without spatial restrictions when using the washbasin.

Another object of the present invention is to provide a filter spout that is attached to a washbasin faucet having a built-in filter to purify all of the water discharged through the built-in filter.

Technical Solution

The filter spout attached to the basin faucet of the present invention for solving the above problems comprises: a connection nozzle screwed to the washbasin faucet outlet and extending a vertical connection tube downward; an elbow pipe in which a vertical receiving pipe is formed in a vertical direction so that the vertical connection tube of the connection nozzle is vertically inserted and a horizontal receiving pipe is formed in a horizontal direction so that the horizontal connection tube of the nozzle body is horizontally inserted; a nozzle body having a horizontal connection tube formed on the side thereof so as to be inserted in the horizontal direction into the horizontal receiving pipe of the elbow pipe and having an open top so that a water filter assembly is accommodated therein; a nozzle cap coupled to an upper portion of the nozzle body; a horizontal rotation member for allowing the vertical connection tube of the connection nozzle to be rotatably coupled to the vertical receiving pipe of the elbow pipe; and a vertical rotation member for allowing the horizontal connection tube of the nozzle body to be rotatably coupled to the horizontal receiving pipe of the elbow pipe.

Preferably, the water filter assembly comprises: a cylindrical filter with a through hole; a lower filter cap that is closed at lower part while being coupled to a lower hole of a cylindrical filter at upper part; and an upper filter cap with a through hole while being coupled to a upper hole of the cylindrical filter at lower part, a packing groove is formed on an outer circumferential surface of the upper filter cap, and a v packing is coupled to the packing groove so that the upper filter cap and the nozzle body are watertight due to the v packing, water supplied from the horizontal connection tube of the nozzle body passes through the cylindrical filter.

Preferably, the water filter assembly comprises: a cylindrical filter with a through hole; a lower filter cap, the lower part of which is closed while being coupled to the lower hole of the cylindrical filter, and a spring positioned in the lower groove of the lower part; and an upper filter cap with a through hole while being coupled to a upper hole of the cylindrical filter at lower part, when the nozzle cap is screwed to the nozzle body and assembled, the upper filter cap is sealed to the sealing packing due to the repulsive force of the spring between the lower filter cap and the nozzle body, water containing rust or foreign substances supplied from the horizontal connection tube of the nozzle body passes through the cylindrical filter.

Preferably, the nozzle cap accommodates the aerator, and a nozzle of the nozzle cap having a smaller diameter than the water outlet of the aerator, and an outer wall of the nozzle cap is provided with an air inlet through which air can pass through the inside and the outside.

Preferably, the horizontal rotation member comprises: a fixing block that is a cylindrical tube and a rotation pin that is inserted and fixed in the fixing block and can rotate relative to the fixing block. The fixing block has a protruding tooth is radially formed on the outside so as to be inserted and fixed into the vertical receiving pipe of the elbow pipe, and a fixing groove is formed in the lower end of the tube to be inclined while the tube is widened. The rotation pin has an upper locking jaw is formed in the upper part and the lower locking jaw is formed in the lower part, and a rotation section is formed therebetween. Since the width of the lower locking jaw is larger than the inner diameter of the fixing block, the lower portion is cut so that the lower locking jaw can be bent into the fixing block to pass through. The rotation pin has a projection radially protruding is formed inside the lower portion of the rotation pin, the projection is matched with the connection tube groove formed in the vertical connection tube of the connection nozzle.

Preferably, the height of the rotating section of the rotation pin is relatively wider than the height of the fixing block, so that the rotation pin can be moved up and down in a state in which the rotation pin is inserted into the fixing block. A fixing clip coupled to the space between the fixing block and the rotation pin.

Preferably, the vertical receiving pipe of the elbow pipe has an O-ring step for positioning an O-ring and a fixing block step for positioning the fixing block so that the vertical receiving pipe is expanded while having a step in the inlet direction. The O-ring is located in the vertical receiving pipe extended together with the O-ring step. The fixing block is inserted into the vertical receiving pipe, and is forcibly press-fitted by a rigid tooth formed radially outside the fixing block, and the lower end of the fixing block abuts against the fixing block step.

Preferably, the vertical rotation member comprises: a fixing block that is a cylindrical tube and a rotation pin that is inserted and fixed in the fixing block and can rotate relative to the fixing block. The fixing block has a protruding tooth is radially formed on the outside so as to be inserted and fixed into the horizontal receiving pipe of the elbow pipe, and a fixing groove is formed in the lower end of the tube to be inclined while the tube is widened. The rotation pin has an upper locking jaw is formed in the upper part and the lower locking jaw is formed in the lower part, and a rotation section is formed therebetween. Since the width of the lower locking jaw is larger than the inner diameter of the fixing block, the lower portion is cut so that the lower locking jaw can be bent into the fixing block to pass through. The rotation pin has a projection radially protruding is formed inside the lower portion of the rotation pin, the projection is matched with the connection tube groove formed in the horizontal connection tube of the connection nozzle.

Advantageous Effects

According to the present invention having the configuration as described above, the water outlet connected to the faucet of the washbasin is configured to rotate 360 degrees in the horizontal and vertical directions, respectively. Unlike the prior art in which the jetting height is lowered, it is possible to jet at an angle and direction suitable for the user's convenience.

For this reason, it is possible to wash hands more conveniently by turning the jetting direction of the faucet spout to the front in the washbasin. In addition, the user may brush his/her teeth or wash his/her hands with the jetting direction of the faucet facing upwards.

DESCRIPTION OF DRAWINGS

The above object and advantages of the present invention will become more apparent by describing in detail exemplary embodiments thereof with reference to the attached drawings in which.

Figure 1:
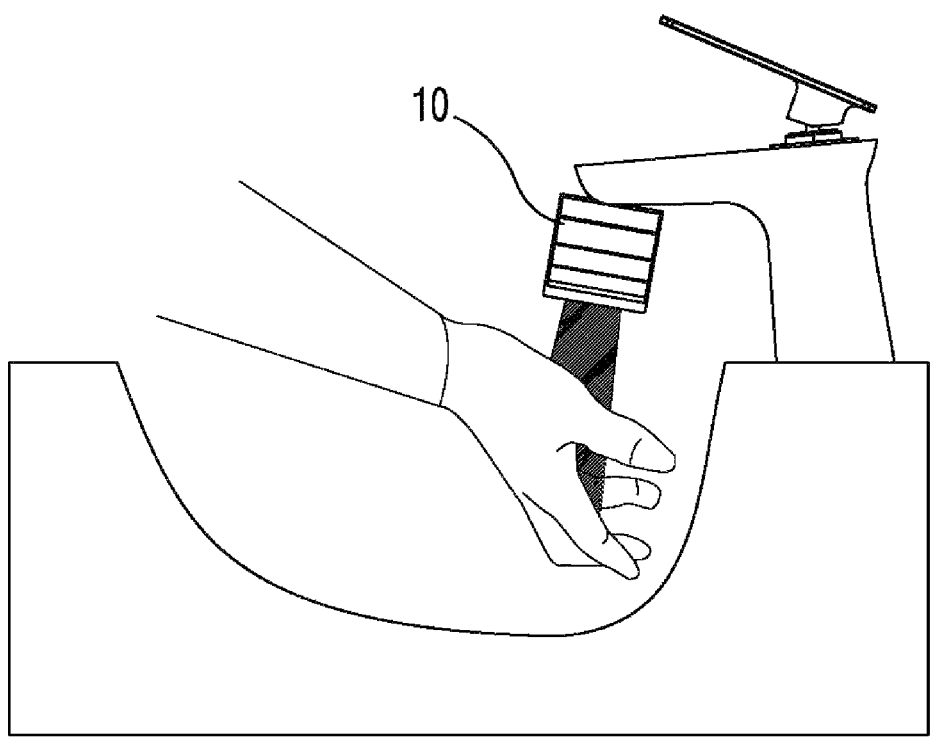
FIG. 1 is a view showing a filter spout attached to a washbasin faucet equipped with a water filter according to the prior art.

DESCRIPTION OF REFERENCE NUMBERS 10, 100: filter spout 110: connection nozzle
111: head part 113: vertical connection tube
115: connection nozzle packing 120: horizontal rotation member
121, 141: fixing block 123, 143: rotation pin
125, 145: fixing clip 127, 147: O-ring
130: elbow pipe 131: vertical receiving pipe
133: horizontal receiving pipe 140: vertical rotation member
150: nozzle body 153: horizontal connection tube
160, 260: water filter assembly 161, 261: cylindrical filter
163, 263: lower filter cap 165: upper filter cap
170: nozzle cap 171: air intake
173: nozzle 180: aerator
181: air hole 190: sealing packing
1131: connection tube groove 1211: tooth
1213: fixing groove 1231: upper locking jaw
1233: lower locking jaw 1235: rotation section
1237: cutout 1239: projection
1311: O-ring step 1313: fixing block step
1651: packing groove 1653: v packing
2631: lower groove 2633: spring

BEST MODE

Hereinafter, a filter spout attached to a washbasin faucet according to a preferred embodiment of the present invention will be described in detail with reference to the accompanying drawings.

Example 1

Figure 2:
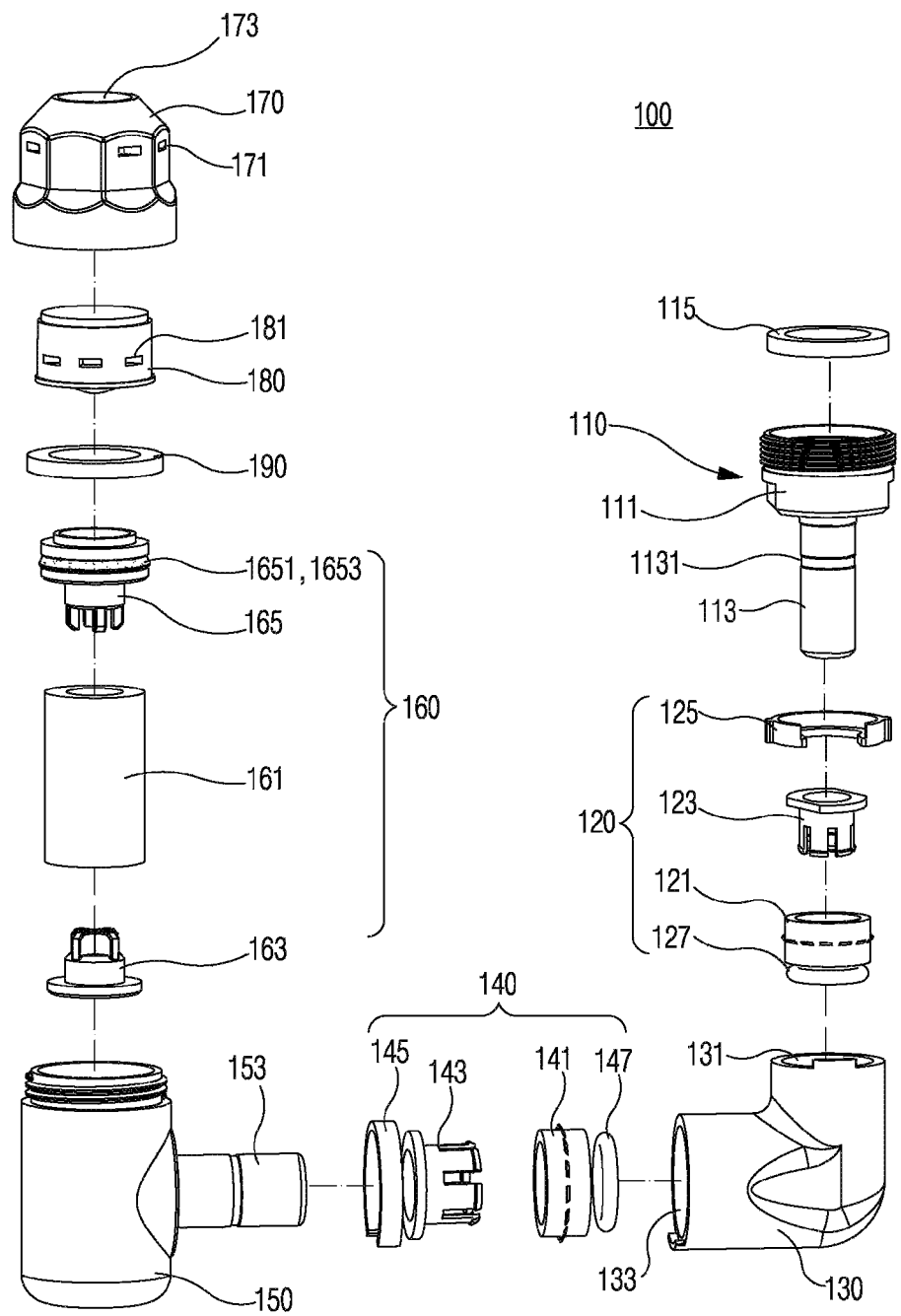
FIG. 2 is an exploded perspective view of a filter spout attached to a washbasin faucet according to a first embodiment of the present invention.
Figure 3:
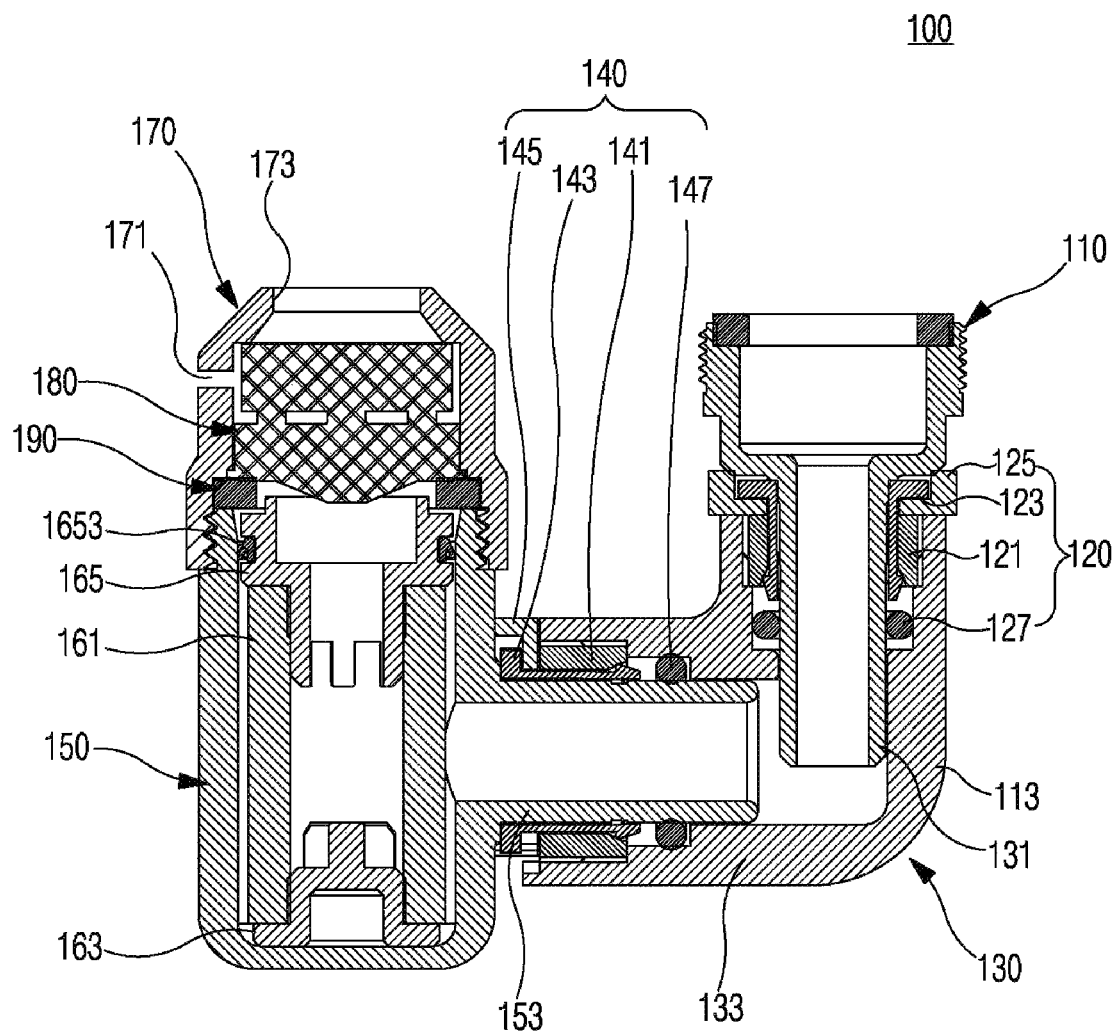
FIG. 3 is a cross-sectional view of a filter spout attached to a washbasin faucet according to a first embodiment of the present invention.
Figure 4:
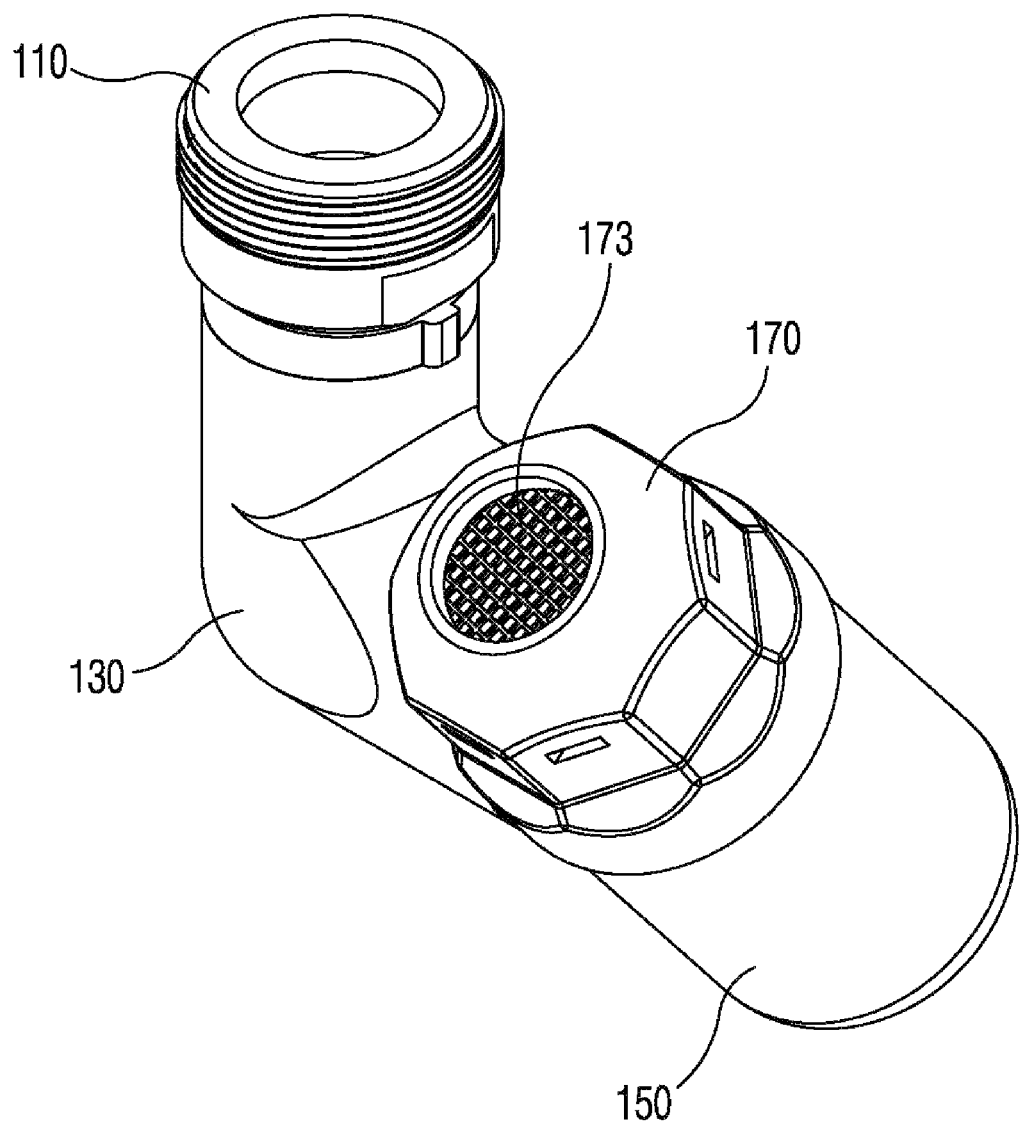
FIG. 4 is a combined perspective view of a filter spout attached to a washbasin faucet according to the first embodiment of the present invention.

FIG. 2 is an exploded perspective view of a filter spout attached to a washbasin faucet according to a first embodiment of the present invention. FIG. 3 is a cross-sectional view of a filter spout attached to a washbasin faucet according to a first embodiment of the present invention. FIG. 4 is a combined perspective view of a filter spout attached to a washbasin faucet according to the first embodiment of the present invention. FIGS. 2 and 3, the nozzle cap 170 is positioned on the left side, and FIG. 4 shows that the nozzle cap 170 rotates to the right while being inclined in the vertical direction at the same time.

Referring to 2 to 4, the filter spout 100 is screwed to the washbasin faucet spout. The filter spout 100 includes a connection nozzle 110 from which a vertical connection tube 113 extends downward; an elbow pipe 130 in which a vertical receiving pipe 131 is formed in the vertical direction so that the vertical connection tube 113 of the connection nozzle 110 is vertically inserted, and a horizontal receiving pipe 133 is formed in the horizontal direction so that a horizontal connection tube 153 of a nozzle body 150 is horizontally inserted; a nozzle body 150 having a horizontal connection tube 153 formed on the side thereof so as to be inserted in the horizontal direction into the horizontal receiving pipe 133 of the elbow pipe 130, an upper portion of the nozzle body 150 is opened to accommodate the water filter assembly 160; a nozzle cap 170 for accommodating the aerator 180 therein while being coupled to the upper portion of the nozzle body 150; a horizontal rotation member 120 that allows the vertical connection tube 113 of the connection nozzle 110 to be horizontally rotatably coupled to the vertical receiving pipe 131 of the elbow pipe 130; and a longitudinal rotation member 140 for vertically rotating the horizontal connection tube 153 of the nozzle body 150 to the horizontal receiving pipe 133 of the elbow pipe 130.

The connection nozzle 110 is composed of a head part 111 screwed to the faucet outlet of the washbasin with a screw thread formed on the outside, and a vertical connection tube 113 extending below the head part 111. The inside of the connection nozzle 110 has a hole in the top and bottom so that a water channel is formed. When the connection nozzle 110 is screwed to the faucet, a connection nozzle packing 115 for watertightness is interposed therebetween.

In the elbow pipe 130, a vertical receiving pipe 131 and a horizontal receiving pipe 133 are connected at right angles to each other. While the vertical connection tube 113 of the connection nozzle 110 is inserted into the vertical receiving pipe 131, it is rotated in the horizontal direction by the horizontal rotation member 120. While the horizontal connection tube 153 of the nozzle body 150 is inserted into the horizontal receiving pipe 133, it is vertically rotated by the vertical rotation member 140. The horizontal rotation member 120 and the vertical rotation member 140 will be described later.

The nozzle body 150 has a horizontal connection tube 153 is formed on the side so as to be inserted into the horizontal receiving pipe 133 of the elbow pipe 130 in the horizontal direction. An upper portion of the nozzle body 150 is opened to accommodate the water filter assembly 160, and a thread is formed at the upper inlet side so that the nozzle cap 170 is screwed therein.

The water filter assembly 160 includes a cylindrical filter 161 with a through hole, a lower filter cap 163 that is closed at lower part while being coupled to a lower hole of a cylindrical filter 161 at upper part, and an upper filter cap 165 with a through hole while being coupled to a upper hole of the cylindrical filter 161 at lower part. A packing groove 1651 is formed on an outer circumferential surface of the upper filter cap 165, and a v-packing 1653 is coupled to the packing groove 1651. The water purification filter assembly 160 filters rust or foreign substances. The purified water passing through the cylindrical filter 161 from the outside to the inside comes out through the upper part of the upper filter cap 165. In addition, due to the v-packing 1653, the upper filter cap 165 and the nozzle body 150 are watertight, so that the water containing rust or foreign substances supplied from the horizontal connection tube 153 of the nozzle body 150 must pass thorough cylindrical filter 161.

The nozzle cap 170 has a screw thread formed inside the lower end so as to be coupled with the upper portion of the nozzle body 150, and has a hole in the top and bottom, and accommodates the aerator 180 therein. In addition, the nozzle cap 170 has an air intake 171 through which air can pass through the inside and outside. Also, the aerator 180 has an air hole 181 through which air can be introduced.

A sealing packing 190 is sealed between the nozzle cap 170 and the nozzle body 160 to prevent the purified water from leaking out.

Figure 5:
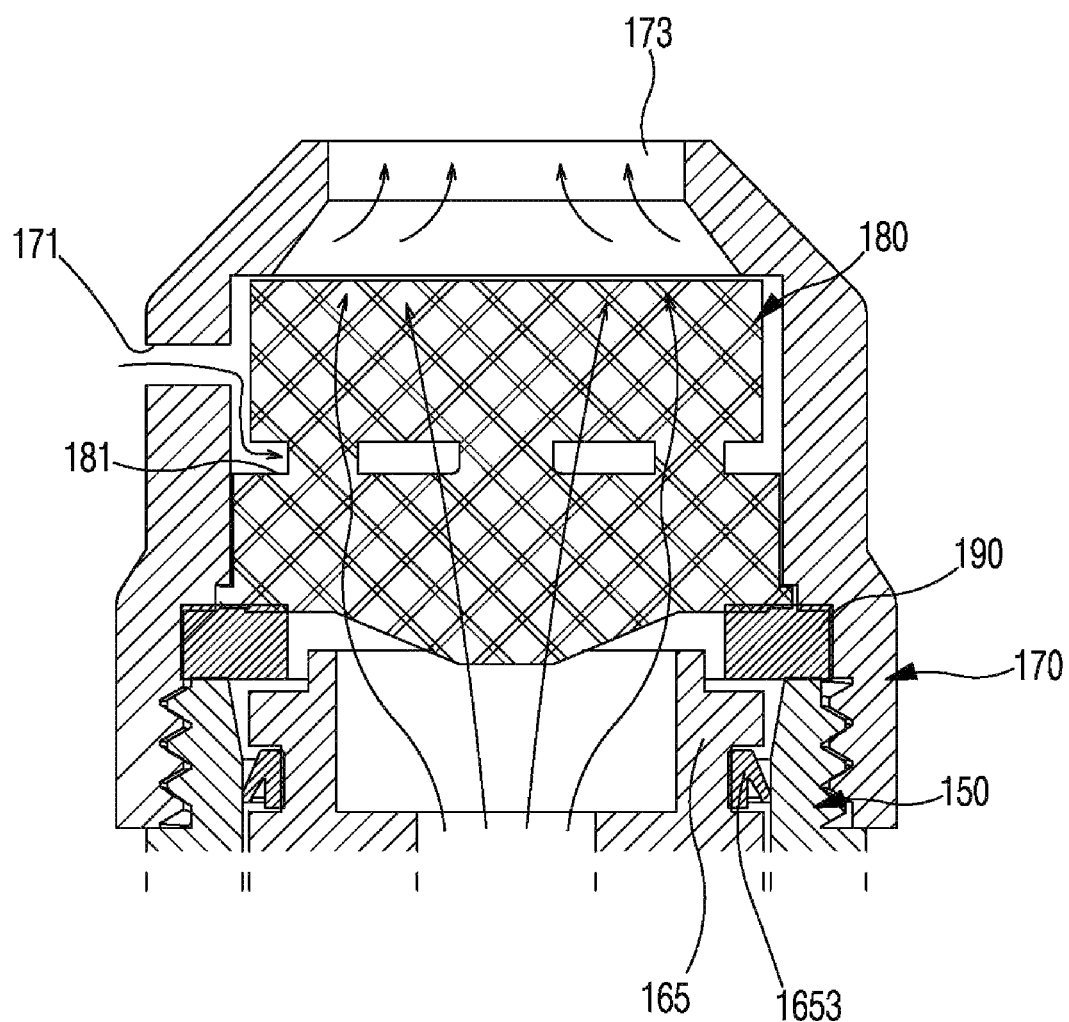
FIG. 5 is a view showing that foam jetting water is formed by the aerator according to the first embodiment of the present invention.

FIG. 5 is a view showing that foam jetting water is formed by the aerator 180 according to an embodiment of the present invention.

Referring to FIG. 5, the purified water passing through the water purification filter assembly 160 passes through the aerator 180. The purified water is mixed with an air passing through the air inlet 171 formed on the outer wall surface of the nozzle cap 170 and the air hole 181 of the aerator 180 to form a foam. The water that has passed through the aerator 180 is jetted through a nozzle 173 having a smaller diameter than the jet port of the aerator 180. In particular, when jetting in a parabolic shape, the shape of the jetting water passing through the aerator 180 is not broken or scattered due to an appropriate nozzle diameter. If the diameter of the jetting port of a conventional aerator and that of nozzle are the same, the water flow is scattered and it is not good to use.

Example 2

In the second embodiment, only the structure of the water filter assembly is different from that of the first embodiment, but other parts are the same. Therefore, only the water filter assembly will be described.

Figure 6:
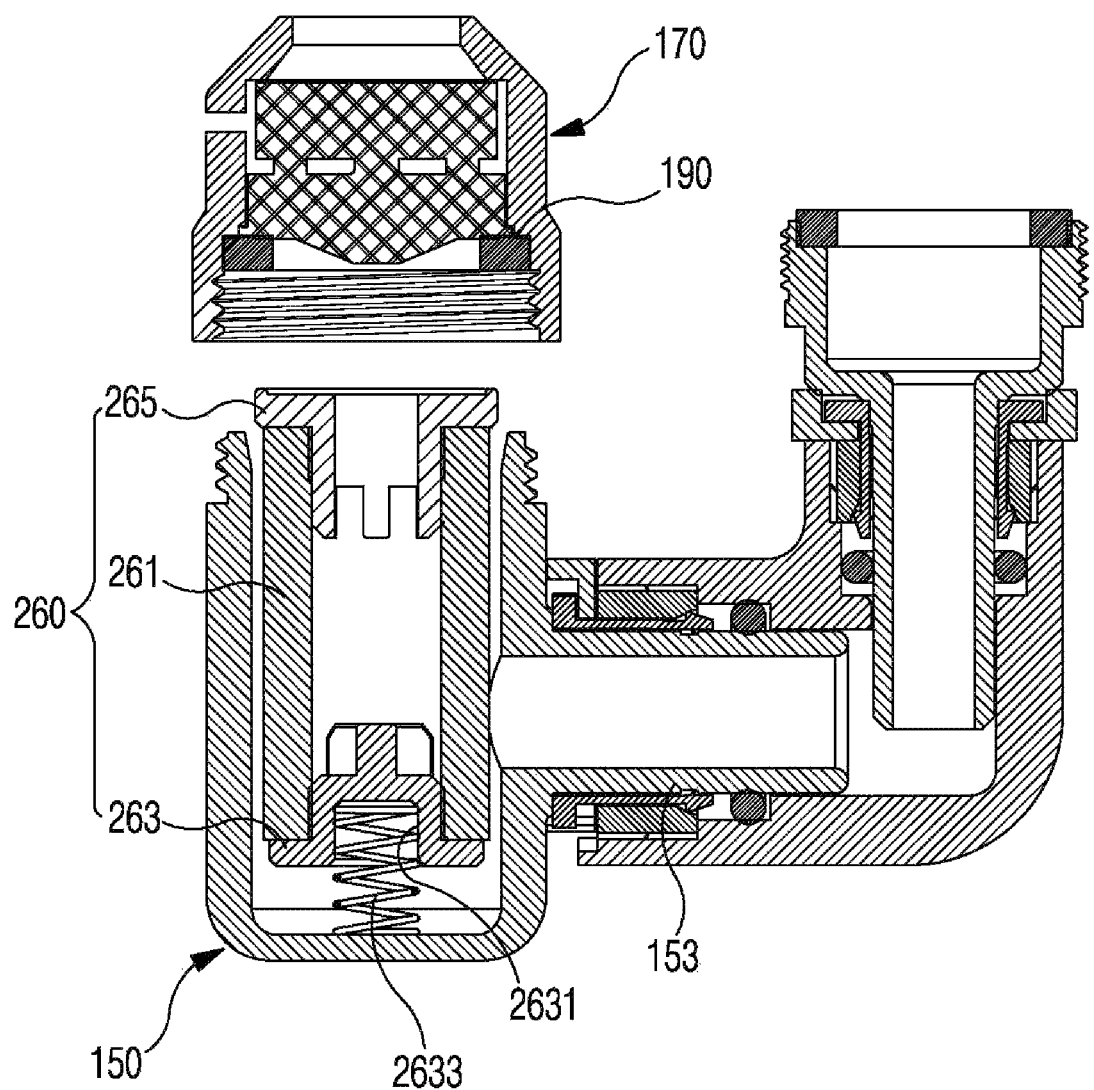
FIG. 6 is an exploded cross-sectional view of a filter spout attached to a washbasin faucet according to a second embodiment of the present invention.
Figure 7:
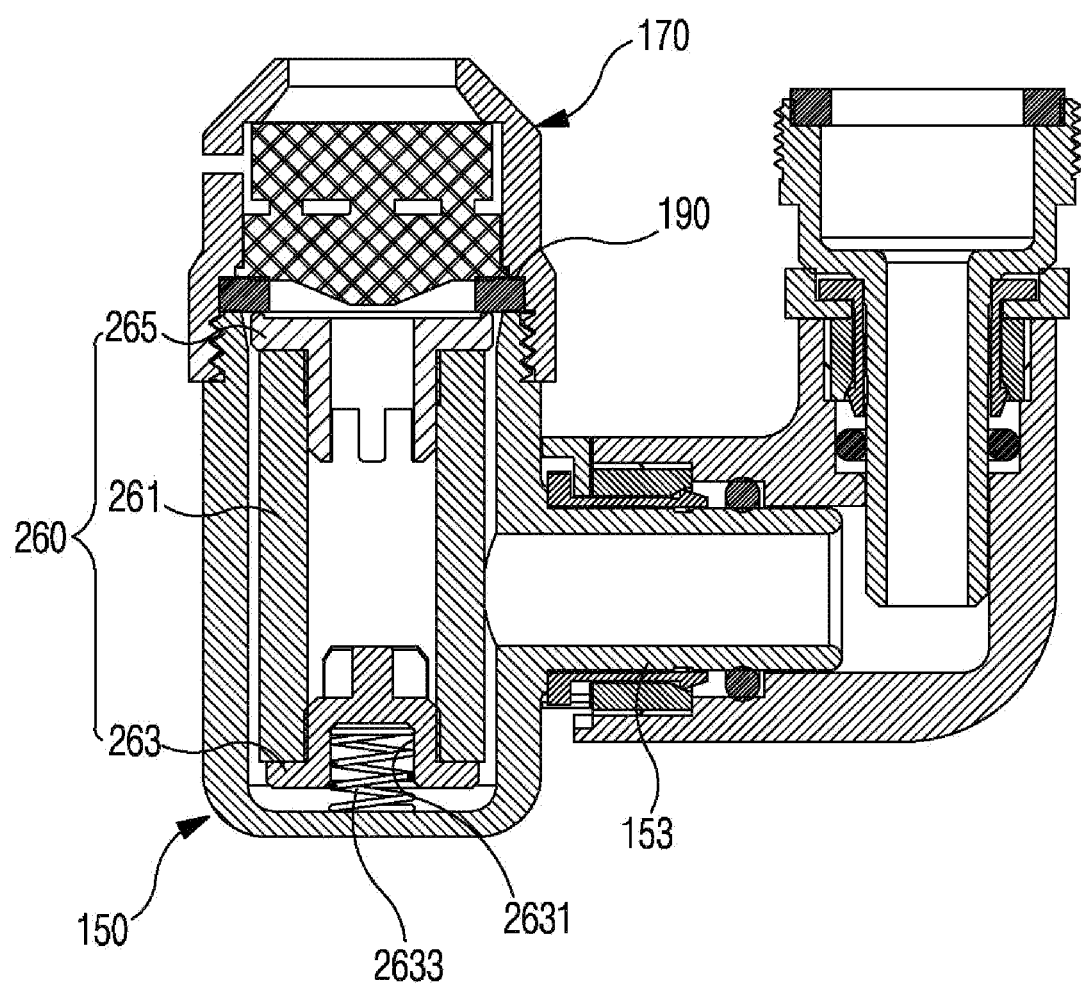
FIG. 7 is a cross-sectional view of a filter spout attached to a washbasin faucet according to a second embodiment of the present invention.

FIG. 6 is an exploded cross-sectional view of a filter spout attached to a washbasin faucet according to a second embodiment of the present invention. FIG. 7 is a cross-sectional view of a filter spout attached to a washbasin faucet according to a second embodiment of the present invention.

Referring to FIGS. 6 and 7, the water filter assembly 260 has a cylindrical filter 261 having a vertical thorough hole, a lower filter cap 263 and an upper cap 265. A lower filter cap 263 is closed at lower part while being coupled to the lower hole of the cylindrical filter 261, and a spring 2633 is located in the lower groove 2631 of the lower portion. A upper filter cap 265 has vertically through-hole while being coupled to the upper hole of the cylindrical filter 261.

The water filter assembly 260 filters rust or foreign substances. The purified water that has passed through the cylindrical filter 261 from the outside to the inside comes out through the upper part of the upper filter cap 265. In addition, the water filter assembly 260 is positioned on the nozzle body 150, and the nozzle cap 170 is screwed to the nozzle body 150 to assemble. When assembling, the upper filter cap 265 is sealed to the sealing packing 190 due to the repulsive force of the spring 2633 between the lower filter cap 263 and the nozzle body 150. Water containing rust and/or foreign substances supplied from the horizontal connection tube 153 of the nozzle body 150 must pass through the cylindrical filter 261. (See FIG. 7)

In addition, when the nozzle cap 170 is disassembled from the nozzle body 150, the water filter assembly 260 comes out of the nozzle body 150 due to the repulsive force of the spring 2633, so that the water filter assembly 260 can be easily removed and replaced. (See FIG. 6)

MODE FOR INVENTION

Hereinafter, the horizontal rotation member 120 and the vertical rotation member 140 according to an embodiment of the present invention will be described. Each coupling of the horizontal rotation member 120 and the vertical rotation member 140 is different only in the direction and size, and since the configuration and operation principle are the same, only the horizontal rotation member 120 will be described with the drawings.

Referring to FIGS. 2 and 3, the horizontal rotation member 120 allows the vertical receiving pipe 131 of the elbow pipe 130 and the vertical connection tube 113 of the connection nozzle to rotate in the horizontal direction. The horizontal rotation member 120 includes a fixing block 121, a rotation pin 123, a fixing clip 125, and an O-ring 127. Similarly, the horizontal receiving pipe 133 of the elbow pipe 130 and the horizontal connection tube 153 of the nozzle body are rotationally coupled to each other in the vertical direction by the vertical rotation member 140. The vertical rotation member 140 includes a fixing block 124, a rotation pin 143, a fixing clip 145, and an O-ring 147

Figure 8:
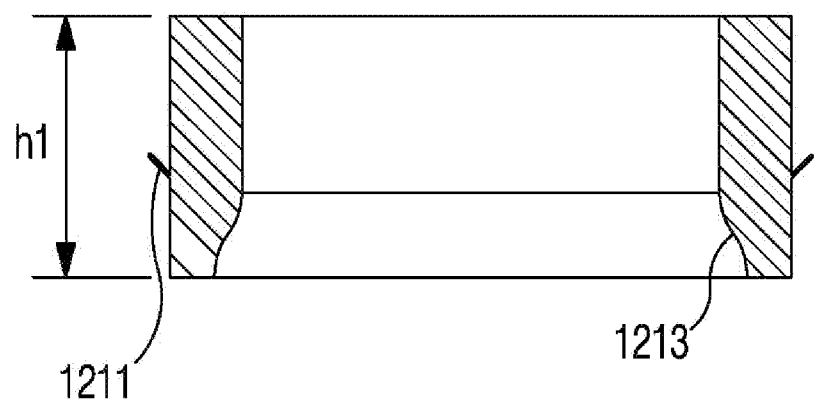
FIG. 8 is a cross-sectional view showing a fixing block of a horizontal rotation member according to an embodiment of the present invention.

FIG. 8 is a cross-sectional view showing the fixing block 121 of the horizontal rotation member 120 according to an embodiment of the present invention.

Referring to FIGS. 2 and 8, the fixing block 121 is a cylindrical tube, and the radially protruding teeth 1211 are formed on the outside, so that the fixing block 121 is inserted into the vertical receiving pipe 131 of the elbow pipe 130 to be fixed. A fixing groove 1213 is formed at a lower end of the tube inside of the fixing block 121 to be inclined as the tube is widened. A locking jaw of a rotation pin 123 to be described later is positioned in the fixing groove 1213.

Figure 9:
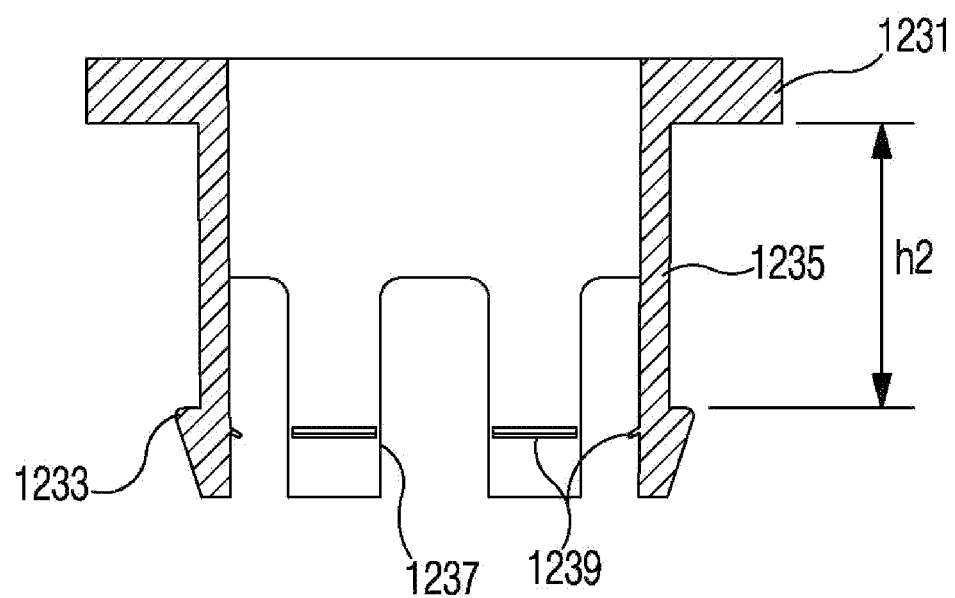
FIG. 9 is a cross-sectional view illustrating a rotation pin of a horizontal rotation member according to an embodiment of the present invention.

FIG. 9 is a cross-sectional view showing the rotation pin 123 of the horizontal rotation member 120 according to an embodiment of the present invention.

Referring to FIGS. 2 and 9, the rotation pin 123 may be rotated relative to the fixing block 121 while being inserted and fixed in the fixing block 121. The rotation pin 123 is a cylindrical tube, and an upper locking jaw 1231 is formed at the upper portion and a lower locking jaw 1233 is formed at the lower portion, and a rotation section 1235 is formed therebetween. The height h2 of the rotation section 1235 of the rotation pin 123 is relatively wider than the height h1 of the fixing block 121. Therefore, the rotation pin 123 can move up and down in a state inserted into the fixing block 121.

The width of the lower locking jaw 1233 is greater than the inner diameter of the fixing block 121. Accordingly, the lower portion of the rotation pin 123 is cut to be formed a cutout 1237 so that the lower locking jaw 1233 can be bent into the fixing block 121 to pass through. In addition, a projection 1239 radially protruding is formed inside the lower portion of the rotation pin 123. The projection 1239 is matched with the connection tube groove 1131 formed in the vertical connection tube 113 of the connection nozzle 110.

Figure 10:
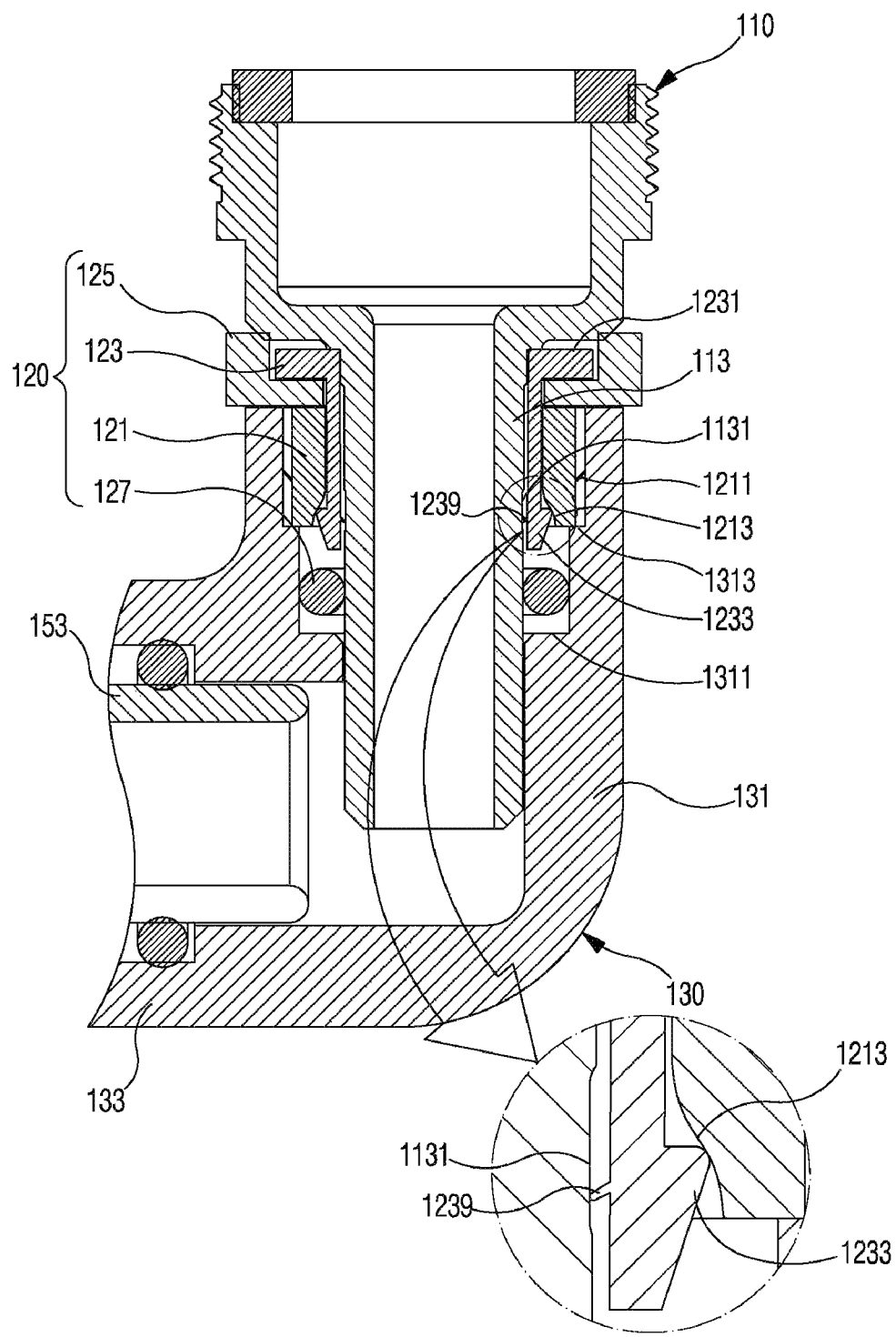
FIG. 10 is a cross-sectional view showing the vertical connection tube and the vertical receiving pipe are fixed by a horizontal rotation member according to an embodiment of the present invention.

FIG. 10 is a cross-sectional view showing the vertical connection tube 113 and the vertical receiving pipe 131 are fixed by the horizontal rotation member 120 according to an embodiment of the present invention.

Referring to FIG. 10, the vertical receiving pipe 131 of the elbow pipe 130 has an O-ring step 1311 for accommodating the O-ring 127 and a fixing block step 1313 for accommodating the fixing block 121. That is, the vertical receiving pipe 131 is expanded while having a step difference in the inner diameter in the inlet direction.

In order to rotationally fix the vertical connection tube 113 to the vertical receiving pipe 131, the O-ring 127 is first inserted into the extended vertical receiving pipe 131 together with the O-ring step 1311.

Next, the fixing block 121 is inserted into the vertical receiving pipe 131, and is forcibly press-fitted by the hard teeth 1211 formed radially outside the fixing block 121. The lower end of the fixing block 121 is in contact with the fixing block step 1313, and the upper end of the fixing block 121 is aligned with the upper end of the vertical receiving pipe 131.

Next, the rotation pin 123 is inserted into the inner diameter of the fixing block 121. The lower locking jaw 1233 of the rotation pin 123 may be narrowed by the cutout 1237, and may pass through the inner diameter of the fixing block 121. After passing through the inner diameter of the fixing block 121, the lower locking jaw 1233 of the rotating pin 123 is extended again and is caught in the fixing groove 1213 of the fixing block 121 so that the rotation pin 123 prevents it from coming out the fixing block 121. In addition, as described above, the height h2 of the rotation section 1235 of the rotation pin 123 is relatively wider than the height h1 of the fixing block 121 so that the rotation pin 123 can move up and down in a state in which it is inserted into the fixing block 121.

Next, the vertical connection tube 113 of the connection nozzle 110 is inserted into the inner diameter of the rotation pin 123, and at this time, the projection 1239 of the rotation pin is inserted into the connection tube groove 1131 of the vertical connection tube 113.

Next, when the rotation pin 123 connected to the vertical connection tube 113 is raised upward, a gap is formed between the upper locking jaw 1231 of the rotation pin 123 and the fixing block 121. Insert the fixing clip 125 in the gap so that the rotation pin 123 does not go down in the direction of the fixing block 121. In this state, the lower locking projection 1233 of the rotation 123 pin presses the inclined surface of the fixing groove 1213 of the fixing block 121. On the other side, the rotating pin projection 1239 presses the connection tube groove 1131 of the vertical connection tube 113. The vertical connection tube 113 is constrained by the rotation pin 123 to prevent it from being pulled out by water pressure or external force.

Figure 11:
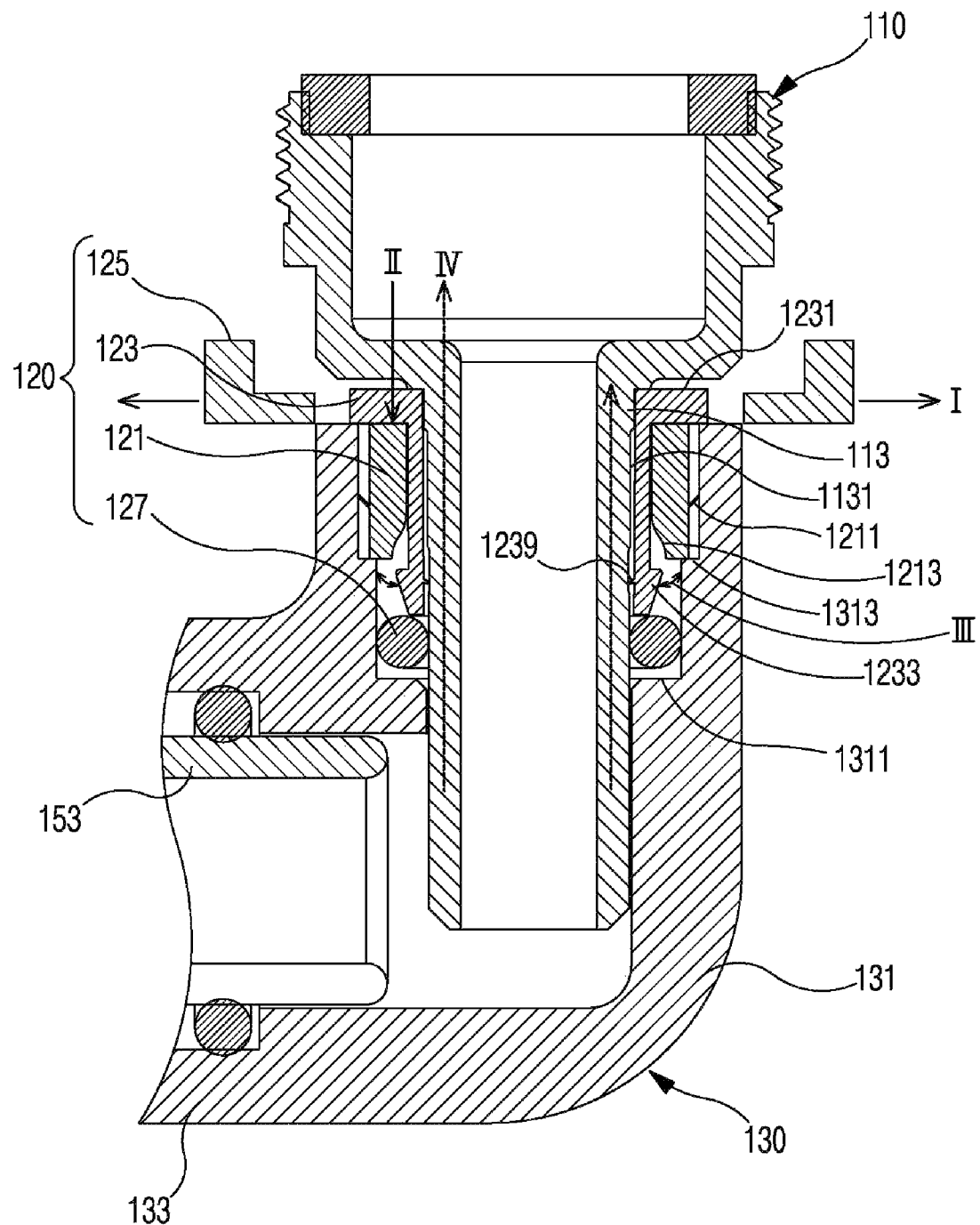
FIG. 11 is a cross-sectional view showing the removal of the vertical connection tube and the vertical receiving pipe by a horizontal rotation member according to an embodiment of the present invention.

FIG. 11 is a cross-sectional view illustrating the removal of the vertical connection tube 113 and the vertical receiving pipe 131 by the horizontal rotation member 120 according to an embodiment of the present invention.

Referring to FIG. 11, in order to remove the vertical connection tube 113 from the vertical receiving pipe 131, the fixing clip 125 is removed (Step I). When the rotation pin 123 is lowered (Step II), a gap is created between the lower locking jaw 1233 of the rotation pin 123 and the fixing groove 1213 of the fixing block 121 (Step III). For this reason, when the vertical connection tube 113 is pulled upward (step IV), the projection 1239 of the rotation pin 123 may be opened in the connection tube groove 1131 of the vertical connection tube 113. When the vertical connection tube 113 is pulled upward, it can be removed from the vertical receiving pipe 131.

According to the present invention, the water outlet connected to the faucet of the washbasin is configured to rotate 360 degrees in the horizontal and vertical directions, respectively, so that unlike the prior art in which the water jetting height is lowered, water can be discharged at an angle and direction suitable for the user's convenience.

Figure 12:
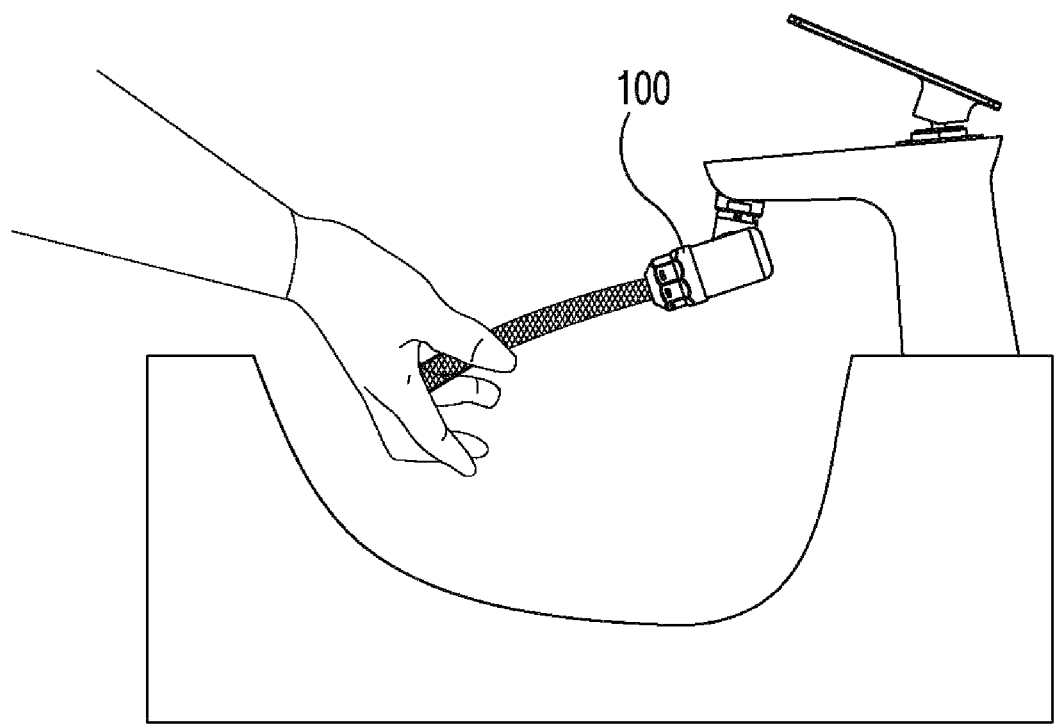
FIGS. 12 and 13 are views in which a filter spout attached to a washbasin faucet is mounted to a faucet according to an embodiment of the present invention.
Figure 13:
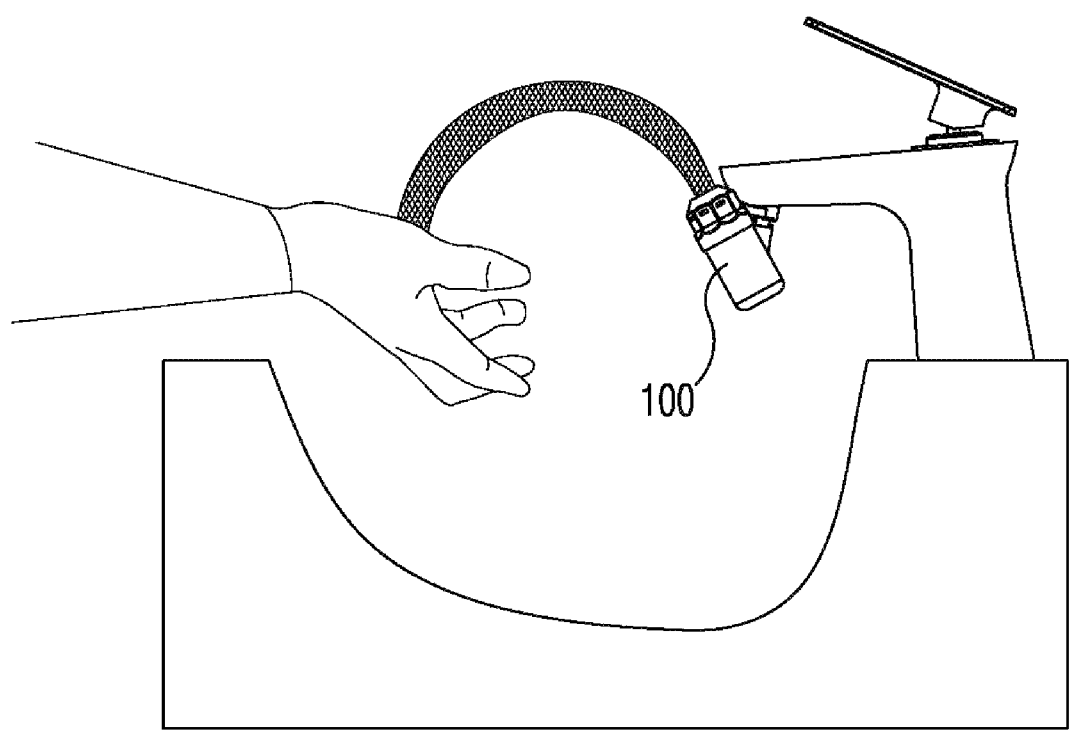

FIGS. 12 and 13 are views in which a filter spout attached to a washbasin faucet is mounted to a faucet according to an embodiment of the present invention.

Referring to FIG. 12, the user can wash the hands conveniently by turning the nozzle of the filter spout 100 of the present invention to the front so that water is discharged forward.

Referring to FIG. 13, the user can wash the hands and rinse the mouth without using a cup when brushing teeth by turning the nozzle of the filter spout 100 of the present invention upward so that water is discharged upward.

Figure 14:
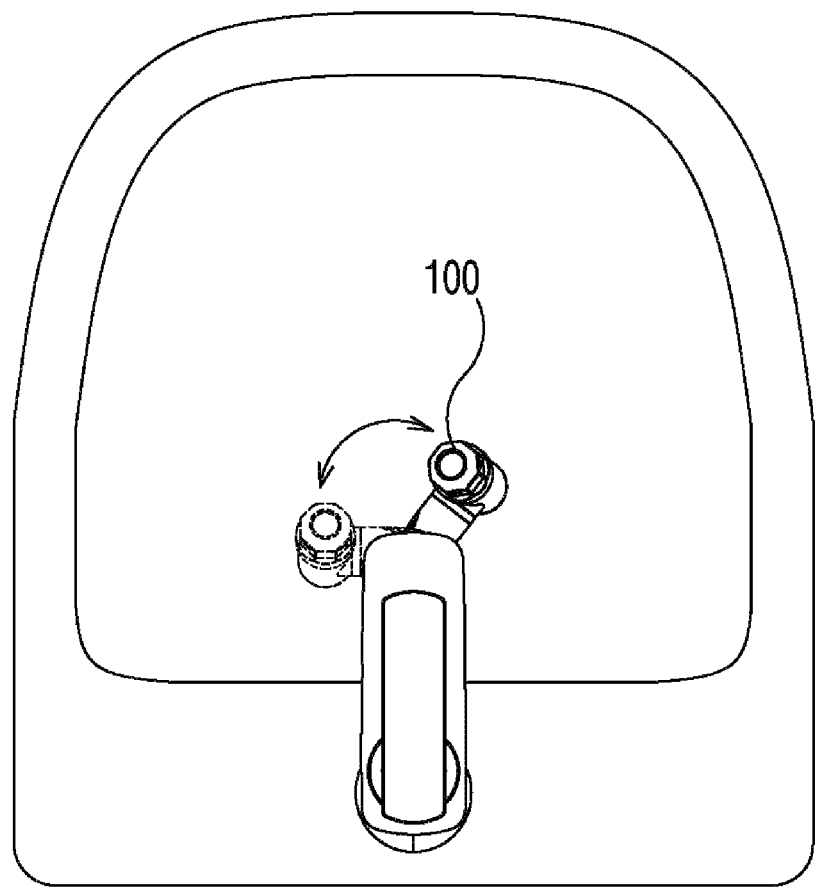
FIG. 14 is a plan view illustrating rotation of a filter spout attached to a washbasin faucet according to an embodiment of the present invention.

FIG. 14 is a plan view illustrating rotation of a filter spout attached to a washbasin faucet according to an embodiment of the present invention.

Referring to FIG. 14, the user can freely rotate the nozzle of the filter spout 100 in the horizontal and vertical directions to freely use the nozzle at any angle according to the environment and user's convenience.

Figure 15:
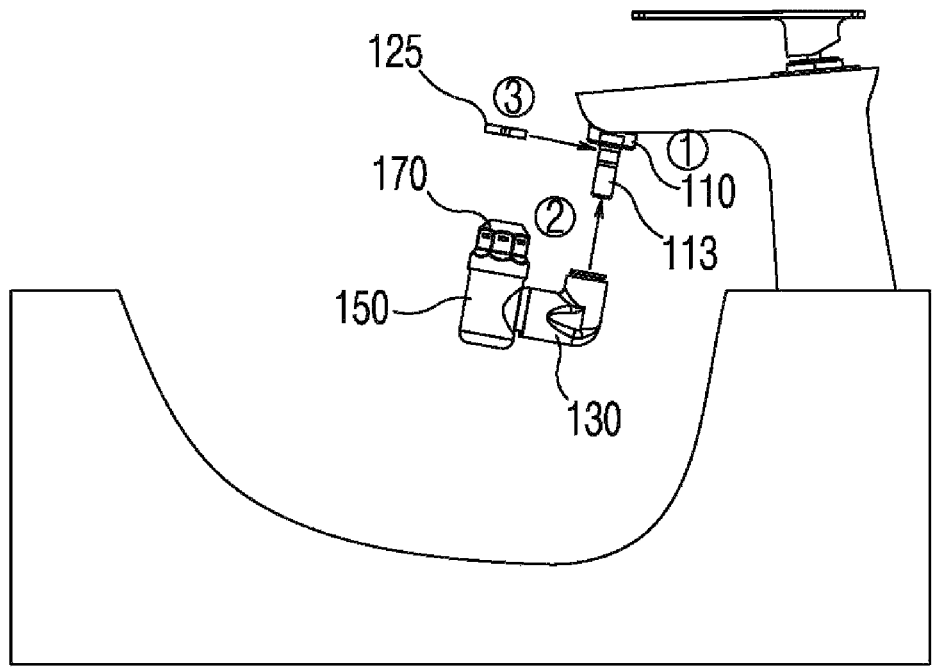
FIG. 15 is a view of installing a filter spout attached to a washbasin faucet according to an embodiment of the present invention.

FIG. 15 is a view of installing a filter spout attached to a washbasin faucet according to an embodiment of the present invention.

Referring to FIG. 15, first, the connection nozzle 110 is screwed to the faucet outlet of the washbasin (step ①).

Next, the vertical connection tube 113 of the connection nozzle 110 is inserted into the entrance of the vertical receiving pipe of the elbow pipe 130 to which the other configuration is combined (step ②).

Next, by inserting the fixing clip 125 into the gap between the rotation pin and the fixing block, the vertical connection tube 113 is rotationally fixed to the elbow pipe 130 (step ③)

Direct installation may be difficult due to the size of the filter spout attached to the washbasin faucet. It is convenient for users to install by themselves because the installation is divided into ①②③ steps above.

While the present invention has been particularly shown and described with reference to preferred embodiments thereof, it will be understood by those of ordinary skill in the art that various changes in form and details may be made therein without departing from the spirit and scope of the present invention as defined by the following claims.

INDUSTRIAL APPLICABILITY

According to the present invention, the water outlet connected to the faucet of the washbasin is configured to rotate 360 degrees in the horizontal and vertical directions, respectively, so that unlike the prior art in which the water jetting height is lowered, water can be discharged at an angle and direction suitable for the user's convenience.

What is claimed is:

1. Filter water spout attached to a basin faucet, comprising:
   a connection nozzle screwed to a washbasin faucet outlet and extending a vertical connection tube downward;
   an elbow pipe in which a vertical receiving pipe is formed in a vertical direction so that the vertical connection tube of the connection nozzle is vertically inserted and a horizontal receiving pipe is formed in a horizontal direction so that the horizontal connection tube of the nozzle body is horizontally inserted;
   a nozzle body having a horizontal connection tube formed on the side thereof so as to be inserted in the horizontal direction into the horizontal receiving pipe of the elbow pipe and having an open top so that a water filter assembly is accommodated therein;
   a nozzle cap coupled to an upper portion of the nozzle body;
   a horizontal rotation member for allowing the vertical connection tube of the connection nozzle to be rotatably coupled to the vertical receiving pipe of the elbow pipe; and
   a vertical rotation member for allowing the horizontal connection tube of the nozzle body to be rotatably coupled to the horizontal receiving pipe of the elbow pipe, wherein:
   the nozzle cap accommodates the aerator,
   a nozzle of the nozzle cap having a smaller diameter than the water outlet of the aerator, and
   an outer wall of the nozzle cap is provided with an air inlet through which air can pass through the inside and the outside.

2. The filter water spout attached to a basin faucet of claim 1, wherein
   the water filter assembly, comprising,
   a cylindrical filter with a through hole;
   a lower filter cap that is closed at lower part while being coupled to a lower hole of a cylindrical filter at upper part; and an upper filter cap with a through hole while being coupled to a upper hole of the cylindrical filter at lower part, wherein:
a packing groove is formed on an outer circumferential surface of the upper filter cap, and a v packing is coupled to the packing groove so that the upper filter cap and the nozzle body are watertight due to the v packing, and
water supplied from the horizontal connection tube of the nozzle body passes through the cylindrical filter.

3. The filter water spout attached to a basin faucet of claim 1, wherein
the water filter assembly, comprising,
a cylindrical filter with a through hole;
a lower filter cap, the lower part of which is closed while being coupled to the lower hole of the cylindrical filter, and a spring positioned in the lower groove of the lower part; and
an upper filter cap with a through hole while being coupled to a upper hole of the cylindrical filter at lower part, wherein:
when the nozzle cap is screwed to the nozzle body and assembled, the upper filter cap is sealed to the sealing packing due to the repulsive force of the spring between the lower filter cap and the nozzle body, and
water containing rust or foreign substances supplied from the horizontal connection tube of the nozzle body passes through the cylindrical filter.

4. Filter water spout attached to a basin faucet, comprising:
a connection nozzle screwed to the washbasin faucet outlet and extending a vertical connection tube downward;
an elbow pipe in which a vertical receiving pipe is formed in a vertical direction so that the vertical connection tube of the connection nozzle is vertically inserted and a horizontal receiving pipe is formed in a horizontal direction so that the horizontal connection tube of the nozzle body is horizontally inserted;
a nozzle body having a horizontal connection tube formed on the side thereof so as to be inserted in the horizontal direction into the horizontal receiving pipe of the elbow pipe and having an open top so that a water filter assembly is accommodated therein;
a nozzle cap coupled to an upper portion of the nozzle body;
a horizontal rotation member for allowing the vertical connection tube of the connection nozzle to be rotatably coupled to the vertical receiving pipe of the elbow pipe; and
a vertical rotation member for allowing the horizontal connection tube of the nozzle body to be rotatably coupled to the horizontal receiving pipe of the elbow pipe,
wherein a horizontal rotation member, comprising:
a fixing block that is a cylindrical tube, wherein
a protruding tooth is radially formed on the outside so as to be inserted and fixed into the vertical receiving pipe of the elbow pipe, and
a fixing groove is formed in the lower end of the tube to be inclined while the tube is widened; and
a rotation pin that is inserted and fixed in the fixing block and can rotate relative to the fixing block, wherein
an upper locking jaw is formed in the upper part and the lower locking jaw is formed in the lower part, and a rotation section is formed therebetween,
since the width of the lower locking jaw is larger than the inner diameter of the fixing block, the lower portion is cut so that the lower locking jaw can be bent into the fixing block to pass through, and
a projection radially protruding is formed inside the lower portion of the rotation pin, the projection is matched with the connection tube groove formed in the vertical connection tube of the connection nozzle.

5. The filter water spout attached to a basin faucet of claim 4, wherein
the height of the rotation section of the rotation pin is relatively wider than the height of the fixing block, so that the rotation pin can be moved up and down in a state in which the rotation pin is inserted into the fixing block,
further comprising a fixing clip coupled to the space between the fixing block and the rotation pin.

6. The filter water spout attached to a basin faucet of claim 4, wherein
the vertical receiving pipe of the elbow pipe has an O-ring step for positioning an O-ring and a fixing block step for positioning the fixing block so that the vertical receiving pipe is expanded while having a step in the inlet direction,
the O-ring is located in the vertical receiving pipe extended together with the O-ring step,
the fixing block is inserted into the vertical receiving pipe, and is forcibly press-fitted by a rigid tooth formed radially outside the fixing block, and the lower end of the fixing block abuts against the fixing block step.

7. Filter water spout attached to a basin faucet, comprising:
a connection nozzle screwed to a washbasin faucet outlet and extending a vertical connection tube downward;
an elbow pipe in which a vertical receiving pipe is formed in a vertical direction so that the vertical connection tube of the connection nozzle is vertically inserted and a horizontal receiving pipe is formed in a horizontal direction so that the horizontal connection tube of the nozzle body is horizontally inserted;
a nozzle body having a horizontal connection tube formed on the side thereof so as to be inserted in the horizontal direction into the horizontal receiving pipe of the elbow pipe and having an open top so that a water filter assembly is accommodated therein;
a nozzle cap coupled to an upper portion of the nozzle body;
a horizontal rotation member for allowing the vertical connection tube of the connection nozzle to be rotatably coupled to the vertical receiving pipe of the elbow pipe; and
a vertical rotation member for allowing the horizontal connection tube of the nozzle body to be rotatably coupled to the horizontal receiving pipe of the elbow pipe,
wherein a vertical rotation member, comprising:
a fixing block that is a cylindrical tube, wherein
a protruding tooth is radially formed on the outside so as to be inserted and fixed into the horizontal receiving pipe of the elbow pipe, and
a fixing groove is formed in the lower end of the tube to be inclined while the tube is widened; and
a rotation pin that is inserted and fixed in the fixing block and can rotate relative to the fixing block, wherein an upper locking jaw is formed in the upper part and the lower locking jaw is formed in the lower part, and a rotation section is formed therebetween, since the width of the lower locking jaw is larger than the inner diameter of the fixing block, the lower portion is cut so that the lower locking jaw can be bent into the fixing block to pass through, a projection radially protruding is formed inside the lower portion of the rotation pin, the projection is matched with the connection tube groove formed in the horizontal connection tube of the connection nozzle.

\* \* \* \* \*